United States Patent
Bokis et al.

(10) Patent No.: US 10,133,268 B2
(45) Date of Patent: Nov. 20, 2018

(54) REAL TIME OPTIMIZATION OF BATCH PROCESSES

(71) Applicants: Constantinos Bokis, Arlington, VA (US); Apostolos T. Georgiou, Reston, VA (US); Peter J. Hanratty, Herndon, VA (US)

(72) Inventors: Constantinos Bokis, Arlington, VA (US); Apostolos T. Georgiou, Reston, VA (US); Peter J. Hanratty, Herndon, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 330 days.

(21) Appl. No.: 14/573,090

(22) Filed: Dec. 17, 2014

(65) Prior Publication Data

US 2015/0212501 A1 Jul. 30, 2015

Related U.S. Application Data

(60) Provisional application No. 61/933,493, filed on Jan. 30, 2014.

(51) Int. Cl.
G05B 23/02 (2006.01)
G05B 13/02 (2006.01)

(52) U.S. Cl.
CPC ....... *G05B 23/0294* (2013.01); *G05B 13/021* (2013.01)

(58) Field of Classification Search
CPC ... G05B 15/02; G05B 23/0294; G05B 13/021
USPC .......................... 700/272, 28, 36, 29, 268, 40
See application file for complete search history.

(56) References Cited

U.S. PATENT DOCUMENTS

| | | | | | |
|---|---|---|---|---|---|
| 3,296,097 | A | * | 1/1967 | Lupfer | B01D 3/425 202/160 |
| 3,428,528 | A | * | 2/1969 | Keeler | B01D 3/4255 196/132 |
| 4,228,509 | A | * | 10/1980 | Kennedy | G05B 13/0205 208/133 |
| 4,506,334 | A | * | 3/1985 | DiBiano | B01D 3/4222 196/132 |

(Continued)

OTHER PUBLICATIONS

J.D. Elliott, "Optimize Coker Operations", Hydrocarbon Processing, Sep. 2003, pp. 85-90.

(Continued)

*Primary Examiner* — Kenneth M Lo
*Assistant Examiner* — Mohammed Shafayet
(74) *Attorney, Agent, or Firm* — Glenn T. Barrett; Andrew T. Ward (57) ABSTRACT

Systems and methods for optimizing a system operating in a first mode of operation include detecting an event associated with a cycle in a first mode of operation. When the cycle ends (i.e., when another event is detected), steady state criteria is applied to determine whether data associated with the cycle satisfies the steady state criteria. Optimization targets can be calculated based on the data associated with the cycle. Control signals including the optimization targets can be applied to a next cycle operating in the first mode of operation to improve process performance.

11 Claims, 8 Drawing Sheets

(56) References Cited

U.S. PATENT DOCUMENTS

| | | | | |
|---|---|---|---|---|
| 4,717,468 A * | 1/1988 | Funk | B01D 3/4255 | 196/132 |
| 4,736,316 A * | 4/1988 | Wallman | B01J 19/0033 | 700/266 |
| 4,866,632 A * | 9/1989 | Mead | C10G 21/30 | 208/327 |
| 5,193,143 A * | 3/1993 | Kaemmerer | G05B 13/028 | 706/45 |
| 5,291,190 A * | 3/1994 | Scarola | G21D 3/08 | 340/3.32 |
| 5,396,416 A * | 3/1995 | Berkowitz | F25J 3/0209 | 700/30 |
| 5,461,462 A * | 10/1995 | Nakane | G03G 15/5041 | 399/15 |
| 5,640,491 A * | 6/1997 | Bhat | B01D 3/425 | 706/23 |
| 5,786,999 A * | 7/1998 | Spahr | B29C 45/766 | 700/197 |
| 5,889,683 A * | 3/1999 | Ismail | G01J 3/453 | 700/271 |
| 6,013,172 A * | 1/2000 | Chang | B01J 19/0006 | 208/113 |
| 6,062,811 A * | 5/2000 | Zombo | F01D 5/187 | 340/449 |
| 6,167,705 B1 * | 1/2001 | Hansen | F01K 25/065 | 60/649 |
| 6,195,998 B1 * | 3/2001 | Hansen | F01K 25/065 | 60/649 |
| 6,263,675 B1 * | 7/2001 | Hansen | F01K 25/065 | 60/649 |
| 6,311,095 B1 * | 10/2001 | Brown | G05B 19/41865 | 700/113 |
| 6,735,541 B2 * | 5/2004 | Kern | G05B 23/0221 | 423/210 |
| 6,925,338 B2 * | 8/2005 | Eryurek | G05B 13/0275 | 700/108 |
| 7,349,746 B2 * | 3/2008 | Emigholz | C10G 11/187 | 700/21 |
| 7,424,395 B2 * | 9/2008 | Emigholz | C10G 11/187 | 702/182 |
| 7,536,274 B2 * | 5/2009 | Heavner, III | G05B 23/024 | 702/183 |
| 7,567,887 B2 * | 7/2009 | Emigholz | C10G 11/18 | 340/500 |
| 7,720,641 B2 * | 5/2010 | Alagappan | C10B 55/00 | 700/30 |
| 7,761,172 B2 * | 7/2010 | Nguyen | G05B 17/02 | 340/679 |
| 8,005,645 B2 * | 8/2011 | Emigholz | C10G 47/36 | 702/185 |
| 8,352,094 B2 * | 1/2013 | Johnson | H02J 3/14 | 700/291 |
| 8,613,838 B2 * | 12/2013 | Wallace | C10G 21/00 | 196/46 |
| 8,615,325 B2 * | 12/2013 | Li | C01B 3/384 | 422/105 |
| 8,634,940 B2 * | 1/2014 | Macharia | C12M 21/12 | 700/28 |
| 8,755,939 B2 * | 6/2014 | Macharia | G05B 13/042 | 700/266 |
| 2001/0049595 A1 * | 12/2001 | Plumer | G06Q 10/00 | 703/22 |
| 2002/0072828 A1 * | 6/2002 | Turner | G05B 13/027 | 700/269 |
| 2004/0049299 A1 * | 3/2004 | Wojsznis | G05B 11/32 | 700/29 |
| 2004/0098159 A1 * | 5/2004 | Brown | G05B 17/02 | 700/117 |
| 2005/0034969 A1 * | 2/2005 | Lah | C10B 25/10 | 202/242 |
| 2005/0267710 A1 * | 12/2005 | Heavner, III | G05B 23/024 | 702/183 |
| 2006/0058898 A1 * | 3/2006 | Emigholz | C10G 11/187 | 700/29 |
| 2006/0073013 A1 * | 4/2006 | Emigholz | C10G 11/18 | 416/35 |
| 2006/0074598 A1 * | 4/2006 | Emigholz | C10G 47/36 | 702/185 |
| 2006/0074599 A1 * | 4/2006 | Emigholz | C10G 11/187 | 702/185 |
| 2006/0171741 A1 * | 8/2006 | Ueda | G03G 15/5008 | 399/167 |
| 2007/0250292 A1 * | 10/2007 | Alagappan | C10B 55/00 | 702/184 |
| 2008/0097637 A1 * | 4/2008 | Nguyen | G05B 23/0254 | 700/110 |
| 2008/0103610 A1 * | 5/2008 | Ebrom | D06F 39/005 | 700/29 |
| 2008/0109100 A1 * | 5/2008 | Macharia | C10L 1/02 | 700/110 |
| 2008/0133044 A1 * | 6/2008 | Grieb | C02F 3/006 | 700/110 |
| 2008/0161958 A1 * | 7/2008 | Davidson | G01J 3/02 | 700/109 |
| 2008/0281557 A1 * | 11/2008 | Emigholz | G05B 13/048 | 702/179 |
| 2009/0063094 A1 * | 3/2009 | Havener | G06Q 10/06 | 702/179 |
| 2009/0069944 A1 * | 3/2009 | Billig | B01J 8/025 | 700/268 |
| 2009/0319092 A1 * | 12/2009 | Piche | H02J 3/38 | 700/295 |
| 2010/0152900 A1 * | 6/2010 | Gurciullo | C01B 3/384 | 700/272 |
| 2011/0098862 A1 * | 4/2011 | Andrei | G05B 13/042 | 700/272 |
| 2011/0106277 A1 * | 5/2011 | Sayyar-Rodsari | G05B 13/04 | 700/30 |
| 2011/0257789 A1 * | 10/2011 | Stewart | G05B 13/048 | 700/272 |
| 2011/0276164 A1 * | 11/2011 | Bourg, Jr. | G05B 13/042 | 700/104 |
| 2011/0288660 A1 * | 11/2011 | Wojsznis | G05B 23/024 | 700/30 |
| 2012/0078408 A1 * | 3/2012 | Li | C01B 3/384 | 700/105 |
| 2013/0067480 A1 * | 3/2013 | Mullet | E06B 9/68 | 718/102 |
| 2013/0110291 A1 * | 5/2013 | Carlin | C10L 5/44 | 700/272 |
| 2013/0180700 A1 * | 7/2013 | Aycock | F24F 11/0001 | 165/248 |
| 2013/0268157 A1 * | 10/2013 | Ok | B61L 15/0081 | 701/31.4 |
| 2014/0174288 A1 * | 6/2014 | Arslan | G05B 23/0221 | 95/1 |
| 2015/0185722 A1 * | 7/2015 | Eager | F01N 3/103 | 700/272 |

OTHER PUBLICATIONS

Y.Z. Friedman, "Why Coker APC Applications are Tough", Hydrocarbon Processing, Dec. 2005, pp. 1-4.

Y.Z. Friedman, S.G. Goodhart and V. Haseloff, "Implementing Coker Advanced Process Control", Hydrocarbon Processing, Jun. 2007, pp. 99-103.

S.Y. Nam, Y.Z. Friedman, P. Kumar and A.B. Azahar, "Delayed Coker Advanced Process Control at Petronas Melaka Refinery", Petroliam Nasional Berhad (Petronas), 2010, pp. 1-10.

A. Savu, I. Muntean, G. Lazea and P. Agachi, "A Study for the Implementation of an Economic Optimization of Coking Plants", Chemical Engineering Transactions, vol. 24, 2011, pp. 409-414.

A.I. Chang, K. Nishioka and T. Yamakawa, "Advanced Control Project Stabilizes Delayed Coker, Increases Throughput", Oil & Gas Journal, vol. 99, No. 34, Aug. 20, 2001, pp. 52-56.

(56) References Cited

OTHER PUBLICATIONS

PCT Application No. PCT/US2014/070836, Communication from the International Searching Authority, Form PCT/ISA/220, dated Mar. 24, 2015, 11 pages.

* cited by examiner

REAL TIME OPTIMIZATION OF BATCH PROCESSES

CROSS-REFERENCE TO RELATED APPLICATIONS

This application claims priority to U.S. Provisional Application Ser. No. 61/933,493 filed Jan. 30, 2014, herein incorporated by reference in its entirety.

BACKGROUND OF THE INVENTION

Field of the Invention

The disclosed subject matter of this application is generally related to systems and methods for optimizing batch systems. Particularly, the present application relates to determining whether a batch process is operating in a steady state and generating optimization targets for cycles operating in the same mode of operation.

Description of Related Art

In control systems, control signals are generally applied as inputs to a process. Real time optimization techniques seek to optimize the performance of the process by re-calculating and updating the control signals based at least in part on system performance measurements. For example, in conventional real time optimization processes, certain variables can be sampled at a defined frequency over a pre-defined period (e.g., one hour). Real time optimization procedures can apply statistical criteria to the sampled data to confirm that the process is operating in steady state, and can compute optimization parameters using various optimization calculation methods. In general, real time optimization is run on a periodic basis, e.g., once every two hours.

Real time optimization techniques can be used in a wide variety of applications including, for example, industrial applications at a refinery. Real time optimization techniques have been applied to a number of traditional refining processes, including crude distillation, hydroprocessing, fluidized catalytic cracking, reforming, and alkylation. Generally, such processes operate in continuous mode and thus do not exhibit significant transient behavior. These processes tend to reach a steady state of operation fairly frequently and therefore can be suitable for conventional real time optimization techniques, which assume a steady state of operation has been achieved.

However, other refining processes also can exhibit significant transient behavior. For example, batch processes tend to exhibit transient behavior when one cycle ends and another cycle begins. For example, in a delayed coker process, transient behavior can be seen when flow is diverted from a first coker drum to a second coker drum and the first coker drum is removed for decoking. Conventional real time optimization techniques can be challenging to implement for batch processes due at least in part to this transient behavior. As such, there remains a need for methods and systems capable of performing real time optimization on batch processes.

SUMMARY OF THE INVENTION

The purpose and advantages of the present application will be set forth in and apparent from the description that follows, as well as will be learned by practice of the disclosed subject matter. Additional advantages of the disclosed subject matter will be realized and attained by the method and apparatus particularly pointed out in the written description and claims hereof, as well as from the appended drawings.

To achieve these and other advantages and in accordance with the purpose of the disclosed subject matter, as embodied and broadly described, the disclosed subject matter includes methods for optimizing a system operating in a first mode of operation. In accordance with one aspect of the disclosed subject matter, the method can include detecting an event associated with a cycle operating in a first mode of operation, determining whether data associated with the cycle satisfies steady state criteria, generating optimization targets for the first mode of operation based on the data, and applying control signals comprising optimization targets, using one or more processors, for a next cycle in the first mode of operation. The event can be, for example, a drum change event or an online spalling transition event.

In certain embodiments of the disclosed subject matter, determining whether data associated with the cycle satisfies steady state criteria can include selecting an offset and determining whether data following the offset from the event satisfies the steady state criteria. The offset can be selected based on a time period of transient behavior in previous cycles operating in the first mode of operation. For example, the offset can be about ninety minutes.

In accordance with additional or alternative embodiments of the disclosed subject matter, determining whether data associated with the cycle satisfies steady state criteria can include separating the cycle into a first cycle portion and a second portion, averaging a first set of data associated with the first cycle portion, averaging a second set of data associated with the second cycle portion, and determining whether the average of the first set of data and the average of the second set of data are within a predetermined tolerance of an overall average. In addition, a maximum value and a minimum value can be compared to the overall average.

The control signal can further include optimized values for control variables. The optimization targets can include at least one of a reflux flow rate, a pumparound flow rate, an overhead temperature, an overhead product specification, and a bottom product specification.

In accordance with another aspect of the disclosed subject matter, the method can further include detecting a second event associated with a second cycle operating in the first mode of operation, determining that data associated with the second cycle satisfies the steady state criteria, adjusting the optimization targets for the first mode of operation based on the data associated with the second cycle, and applying second controls comprising the adjusted optimization targets for a subsequent cycle in the first mode of operation. Additionally or alternatively, the method can further include detecting a second event associated with a second cycle operating in the first mode of operation, determining that data associated with the second cycle does not satisfy the steady state criteria, applying the control signals comprising the optimization targets, without adjusting the optimization targets based on the data associated with the second cycle, for a subsequent cycle in the first mode of operation.

In accordance with a further aspect of the disclosed subject matter, an apparatus for optimizing a system operating in a first mode of operation is disclosed. The system includes a monitoring component configured to detect an event associated with a cycle operating in a first mode of operation, a steady state determination component configured to determine whether data associated with the cycle satisfies steady state criteria, an optimization target generator configured to generate optimization targets for the first mode of operation based on the data, and a controller configured to apply control signals including optimization targets for a next cycle operating in the first mode of operation.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 3 is a graph illustrating representative transient behavior caused by batch processes in accordance with the disclosed subject matter, wherein FIG. 3A shows the outlet temperatures of coking drums before, during, and after a drum switch event, while FIG. 3B and FIG. 3C each shows the effects of the drum switch event on main fractionator temperatures and flow profiles, respectively.

DETAILED DESCRIPTION OF THE PREFERRED EMBODIMENT

Overview

Reference will now be made in detail to representative embodiments of the disclosed subject matter, examples of which are illustrated in the accompanying drawings. The structure and corresponding method of operation of the disclosed subject matter will be described in conjunction with the detailed description of the system.

Generally, the disclosed subject matter is directed to a method for optimizing a system operating in a first mode of operation, the method comprising detecting an event associated with a cycle in a first mode of operation, determining whether data associated with the cycle satisfies steady state criteria, generating optimization targets for the first mode of operation, and applying control signals comprising the optimization targets, using one or more processors, for a next cycle in the first mode of operation.

The terms "optimized" and "optimization," as used herein, will be recognized by those having ordinary skill in the art in the refinery industry as not requiring perfect or ideal performance, but can also include enhanced or improved performance.

Additionally, an apparatus is provided herein. The system generally includes a monitoring component configured to monitor the system to detect an event associated with a cycle in a first mode of operation, a steady state determination component configured to determine whether data associated with the cycle satisfies steady state criteria, an optimization target generator configured to generate optimization targets for the first mode of operation based on the data, and a control component configured to apply control signals comprising optimization targets for a next cycle in the first mode of operation. The term "component," as used herein, can refer to a single element, a system, or an assembly capable of performing the desired function.

Figure 1:
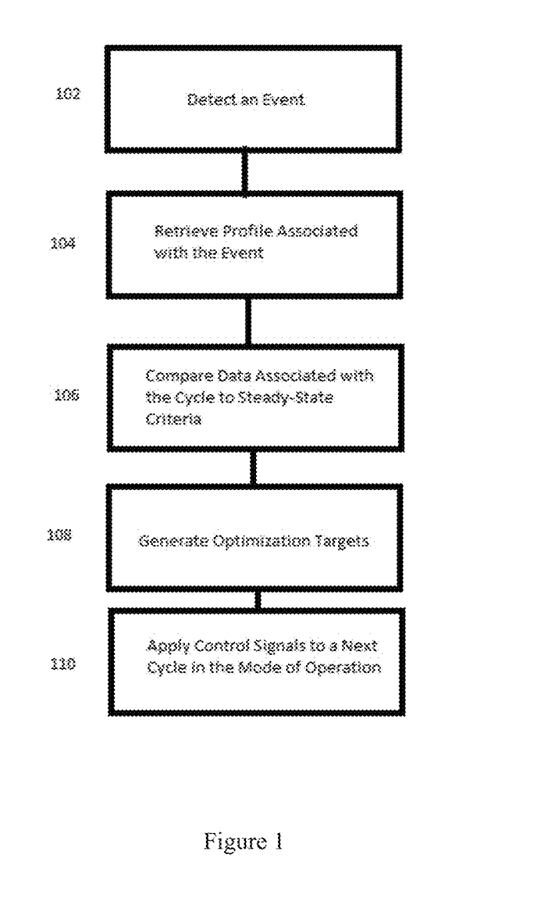
FIG. 1 is a flow chart illustrating a representative embodiment of a method for optimizing a system operating in a first mode of operation in accordance with the disclosed subject matter.

In accordance with an aspect of the disclosed subject matter, and with reference to FIG. 1, an exemplary method for performing real time optimization of a batch process is shown. The term "batch process," as used herein, refers to batch processes as well as processes that operate in a combination of batch and continuous mode. For example, a delayed coker unit can include coking drums that operate in batch mode and downstream separation units that operate in continuous mode. For purposes of explanation and not limitation, batch processes can include coking processes, lubrication processes, polymerization processes, and the like.

Figure 2:
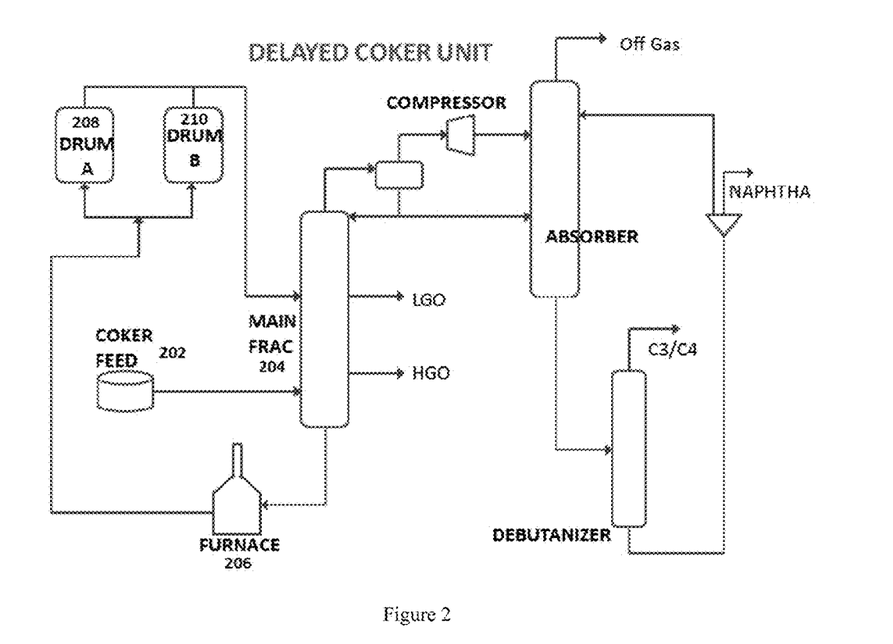
FIG. 2 is a schematic diagram illustrating a representative delayed coker unit suitable for optimization using methods in accordance with the disclosed subject matter.

An exemplary delayed coker unit operating a batch process in accordance with the disclosed subject matter is shown in FIG. 2. In operation, a petroleum stream such as a vacuum tower bottom stream (resid) can arrive from a coker feed 202 and enter the bottom of the main fractionator 204. The resid can drop to the coker furnace 206. In the coker furnace 206, the resid molecules can be thermally cracked at very high temperatures. The cracked vapor products and the coke can enter one of the coke drums 208 and 210. Coke can be deposited in the coke drums 208 and 210, while the vapor products can proceed to the main fractionator 204 for further separation.

Coke drums 208 and 210 can operate in parallel. For example and not limitation, while Drum A 208 is in service coking (i.e., is receiving the coke and cracked vapor products from the coker furnace 206), Drum B 210 can be out of service and the coke can be removed therefrom. When Drum A 208 becomes full, the feed can be diverted into empty Drum B 210. Drum A 208 can then be removed from service for decoking (i.e., the coke can be removed from Drum A 208).

Figure 3:
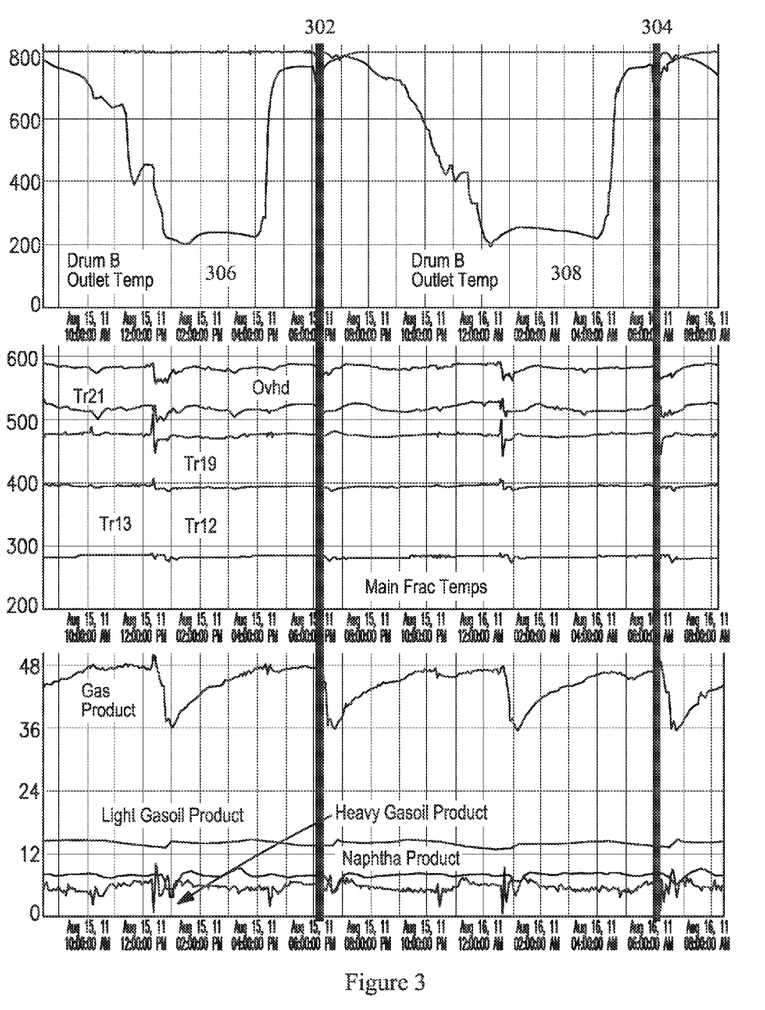

The diversion of the feed from Drum A 208 to Drum B 210, which is referred to herein as a "drum switch event," can cause a change in the operation of the main fractionator 204. With reference to FIG. 3, test results from an exemplary drum switch event are shown. Line 302 indicates a drum switch event in which feed is diverted from Drum A to Drum B and Drum A is removed from service for decoking. Line 304 indicates a drum switch event in which the feed is diverted from Drum B back to Drum A and Drum B is removed from service for decoking. FIG. 3A shows the outlet temperatures of Drum A and Drum B. When feed is diverted from Drum A to Drum B at 302, the temperature of Drum B (shown at 306) has not reached maximum temperature. Therefore, feed vapors can condense in the drum, leaving a lower amount of vapor feed to reach enter the main fractionator. A similar pattern is shown for the temperature of Drum A (shown at 308) when the feed is diverted from Drum B to Drum A at 304. Vapors that condense in the drum can vaporize over time and enter the main fractionator.

FIGS. 3B and 3C each illustrates the representative effects of the drum temperature on the operation of the main fractionator at drum switch events. For example, FIG. 3B shows the temperatures at the tower overhead (OVHD) as well as at a number of trays within the main fractionator. The trays are, from top to bottom, Tray 21, Tray 19, Tray 13, and Tray 12. FIG. 3C shows the corresponding product flows out of the main fractionator. As shown, the drum switch event causes a transient period in the product flows. In the example shown in FIG. 3, drum switch events 302 and 304 can occur, for example and without limitation, every 6 hours. As embodied herein, the transient period for the product flows lasts about 90 minutes. However, the transient period can vary based on a number of factors, including the frequency of drum switch events and the number of drums used in the process.

Figure 4:
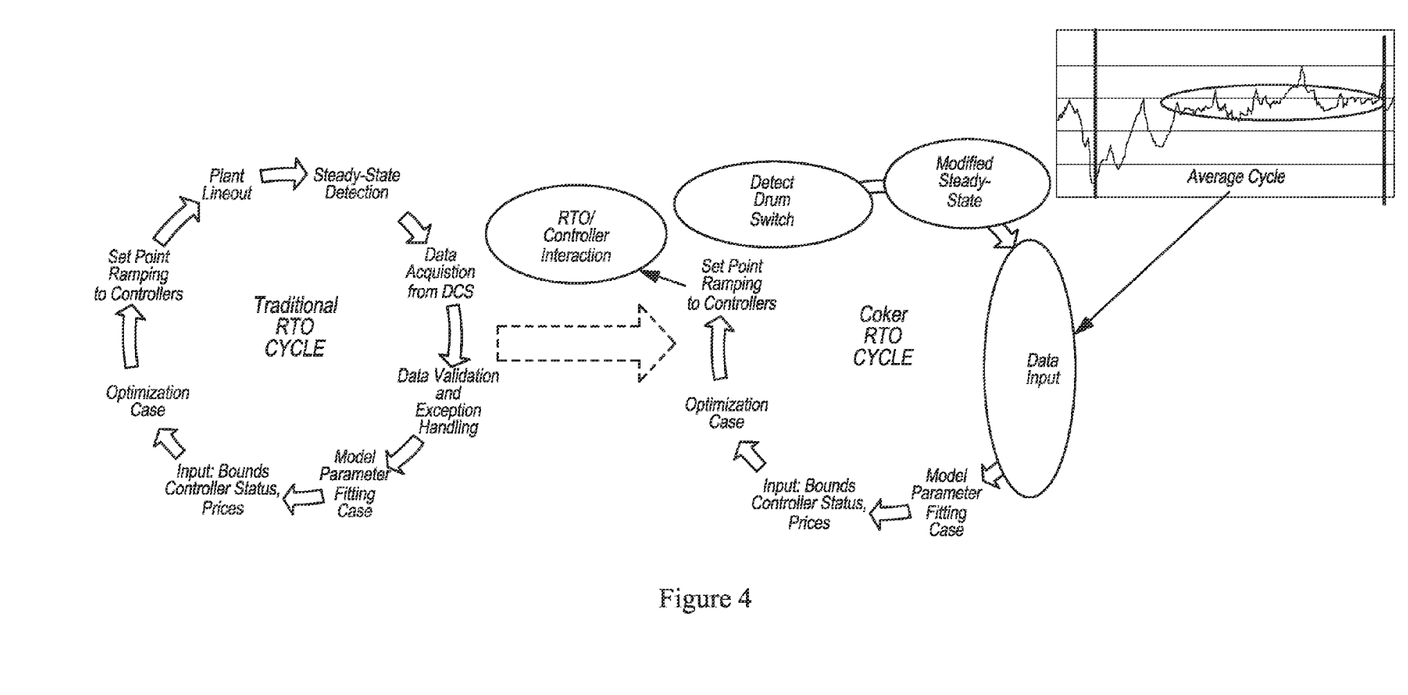
FIG. 4 is a flow diagram illustrating conventional optimization processes and an exemplary embodiment of an optimization process in accordance with the disclosed subject matter, for purpose of illustration and comparison.

In accordance with certain exemplary embodiments, such as illustrated in FIG. 1, the method includes detecting an event at 102. In contrast, conventional systems generally start at a pre-defined time interval, as shown in FIG. 4. As used herein, the term "event" does not indicate the expiration of a pre-determined time interval, but rather marks the start of a new cycle.

As noted above, an event indicates the start of a cycle. In accordance with embodiments of the disclosed subject matter, events can include a drum switch event and an online spalling transition event. Drum switch events can occur in a delayed coker unit having two or more drums when the process switches from a first coking drum to a second coking drum so that coke can be removed from the first coking drum. Online spalling can include the discontinuation of resid feed from one or more of the furnace flow passes and the introduction of water flows through the furnace flow passes in its place. Online spalling can be used to remove coke buildup from the inside of the furnace passes. During online spalling, overall unit throughput can be reduced, and a large amount of water can arrive in the main fractionator and downstream units. An online spalling transition event can occur when the process transitions into or out of an online spalling configuration. An online spalling transition event can also occur when the process transitions from a first online spalling configuration to a second online spalling configuration.

Each cycle can operate in a mode of operation. In accordance with certain embodiments of the disclosed subject matter, the mode of operation changes only when an online spalling transition event occurs. For example, in an embodiment where the system is a delayed coker unit having two coking drums, the system can operate in a first mode of operation. When a drum switch event occurs, the system can continue operating in the first mode of operation. However, when an online spalling transition event occurs, the system switches to a second mode of operation to account for the change in operating parameters (e.g., flow parameters). At the next online spalling transition event, the system can switch back to the first mode of operation or to a third mode of operation, depending on the configuration. In accordance with other embodiments of the disclosed subject matter, an event is associated with an event-specific mode of operation such that every cycle following the event operates in the event-specific mode of operation.

When an event is detected, the system can retrieve a profile associated with a mode of operation corresponding to the event from a database at 104. In accordance with embodiments of the disclosed subject matter, a profile can be obtained from the database only when a new mode begins. In such embodiments, no profile is retrieved when the system remains in a constant mode. For example, if the system is operating in a first mode of operation and an online spalling transition event is detected, a profile associated with a second mode of operation can be retrieved. However, if the system is operating in the first mode of operation and a drum switch event is detected (i.e., an event which does not indicate a switch to a new mode of operation), no profile is recovered. Instead, real-time optimization can be applied to the existing control signals.

In accordance with exemplary embodiments of the disclosed subject matter, an event can correspond to a single mode of operation. Alternatively, an event can correspond to two or more modes of operation. After the detection of an event corresponding to two or more modes of operation, the system can continue to identify the mode of operation based on, e.g., input parameters such as process flows or temperatures. For example, and as explained in further detail herein, an online spalling transition indicates that the system is switching to a new mode of operation. The new mode of operation can depend at least in part on the configuration of the furnace flow passes and the flow rates. As such, an additional process can be run to distinguish between the plurality of potential modes of operation.

The profile for a mode of operation can include control signals. The control signals can include optimized values for the control variables for the system when operating in the mode of operation associated with that event. Control signals can also include optimization targets or directions. For example, in some situations, the optimized value for a control variable can vary according to, e.g., feed properties or operating conditions. Thus, a single optimized value for certain control variables can become obsolete during the process. Therefore, rather than providing a single optimized value, the control signal can be an optimization target that can cause the controller to maximize or minimize one or more outputs using the values of the control variable over an allowed range. Control signals are inputs into the process, and can include, for purposes of explanation and not limitation, column reflux rate, column pumparound flows, column overhead temperature, column pressure, column overhead product specifications, column bottom product specifications, and steam flows.

For example, and as embodied herein, the profile associated with a first mode of operation can include the control signals for operation in a first furnace configuration. Similarly, the profile associated with a second mode of operation can include the control signals for operation in a second mode of operation. Different modes of operation can have different objectives and, therefore, can have different values for the control signals.

During the cycle, data associated with the cycle can be measured. The data can include, for example, temperatures, pressures, product qualities, and flow rates at locations throughout the process. This data can be measured using one or more sensors positioned around the system.

Data measured during the cycle can be stored in a storage medium for future analysis. For example and without limitation, continuous data from a particular sensor over a period of six hours can be stored and, following the completion of the cycle, can be analyzed to determine whether the data can be used for optimization. The data can be stored in any storage medium as known in the art for its intended purpose.

In accordance with another aspect of the disclosed subject matter, and with further reference to FIG. 1, data associated with the cycle can be compared to steady-state criteria to determine whether the steady-state criteria is satisfied at 106. An exemplary method for determining whether the data satisfies the steady-state criteria in accordance with the disclosed subject matter is shown in FIG. 5.

An offset can be applied at 502. The offset can be, for example, the transient period. The offset can be determined based on review of the transient period over a number of runs. As previously noted, the length of the transient period can vary based on a number of factors, including the frequency of drum switch events and the number of drums used in the process. In addition, the offset can vary based on the mode of operation. Conventional process include only a line-out during the time period when the new control signals are implemented and do not account for the transient effects caused by batch processes as described herein.

Figure 6:
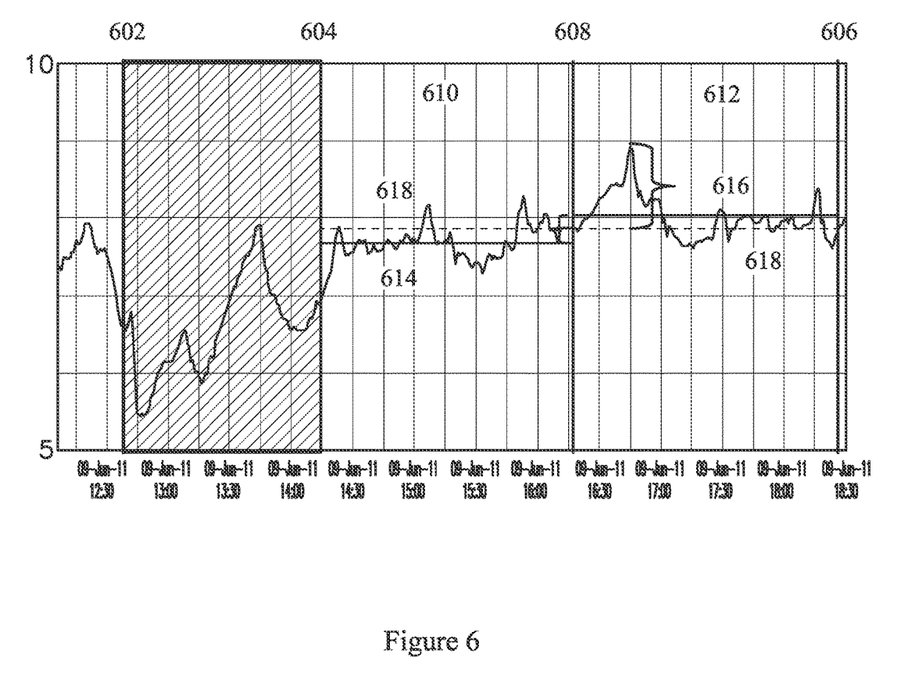
FIG. 6 is a graph illustrating measurements for one output using an exemplary embodiment for determining whether data associated with a cycle satisfies steady state criteria in accordance with the disclosed subject matter.

For example, data from a delayed coker process in accordance with an exemplary embodiment of the disclosed subject matter is shown in FIG. 6. In particular, FIG. 6 shows a product flow of the main fractionator. An event such as a drum switch event can occur at 602. The pre-defined offset is shown at 604. As shown, the process can exhibit significant transient behavior in the time period prior to offset 604. In accordance with exemplary embodiments of the disclosed subject matter, the technique can be implemented to record no measurements during the offset period.

Figure 5:
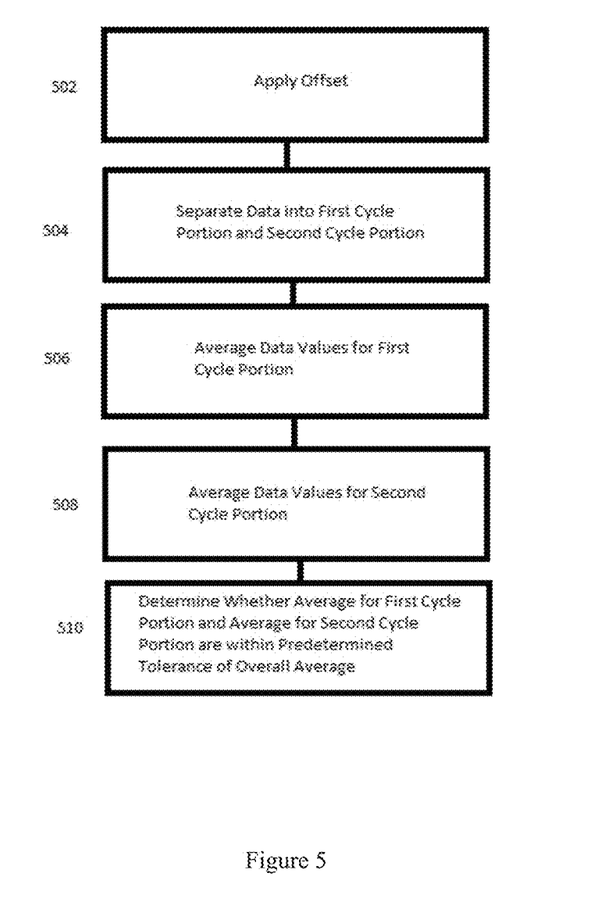
FIG. 5 is a flow chart illustrating a representative embodiment of a method for determining whether data associated with a cycle satisfies steady state criteria in accordance with the disclosed subject matter.

In accordance with the disclosed subject matter, and with further reference to FIG. 5, the data following the offset can be separated into a first cycle portion and a second cycle portion. The first cycle portion and the second cycle portion can be, for example, the first half of the cycle following the offset and the second half of the cycle following the offset.

As shown in FIG. 6, data after the offset 604 and before the next event, i.e., the start of the next cycle at 606, can be considered. The time period can be divided, for example, in half at 608. The first portion of the cycle 610 can represent the time period after the offset 604 and before the divider 608. The second portion of the cycle 612 can represent the time period after the divider 608 and before the start of the next cycle 606.

In accordance with aspects of the disclosed subject matter, and with further reference to FIG. 5, an average of the data values in the first cycle portion can be determined at 506. Similarly, the average of the data values in the second cycle portion can be determined at 508. The average of the data values in first portion 610 in FIG. 6 is shown at 614. The average of the data values in the second portion 612 are shown at 616.

The average for the entire period after the offset and before the beginning of a next cycle can be calculated at 510. The average of all data values between after the offset 604 and the beginning of the next cycle 606 in FIG. 6 is shown at 618.

The averages of the first and second cycle portions can be compared to the overall average at 512. If the averages of the first and second cycle portions are within a predetermined tolerance of the overall average, the data can be used to generate optimization targets. Otherwise, the data can be discarded and the current optimized values can be used in the next cycle associated with the mode of operation without updates.

The determination of whether the data associated with the cycle satisfies steady state criteria can be made using a single process output. Alternatively, two or more process outputs can be used to determine whether the data associated with the cycle satisfies the steady state criteria. In accordance with exemplary embodiments of the disclosed subject matter, a plurality of process outputs are considered and the data for each of the process outputs must satisfy the steady state criteria. For example, the exemplary method shown in FIG. 5 can be run in parallel for each of the plurality of process outputs, and all data will be discarded unless the averages for the first cycle portion and the second cycle portion are within a predetermined tolerance of the overall average for each output. However, persons of skill in the art will recognize that the tolerances for each process output can vary.

Two or more steady state criteria can be analyzed for each cycle. For example, the process shown in FIG. 5 can be supplemented with a second steady-state determination. The overall average for each output can be compared to a maximum value and a minimum value for the output. For example, a spike tolerance can be defined. The spike tolerance can be the same as the tolerance described with respect to FIG. 5, or can be a different tolerance value. A spike is identified every time the measured output data crosses the spike tolerance, i.e., every time the data is either lesser than the average value less the spike tolerance or greater than the average value plus the spike tolerance. A number of spikes threshold can also be defined. The data can be deemed unsteady, and thus discarded, if the number of spikes is greater than the number of spikes threshold.

In contrast, and as shown in FIG. 4, conventional optimization processes sample outputs with a defined frequency rather than considering all data values. In addition, conventional optimization processes only consider the data sampled over a pre-defined time period, and determine whether the samples over the pre-defined time period satisfy some statistical criteria. As such, conventional optimization processes tend to discard data for batch processes due at least in part to the transient behavior at the start of the process, and generally do not provide a mechanism for determining whether some portion of the data following transient behavior is consistent in the short term and over a long period. In addition, conventional optimization processes require an additional line-out period. Historical data can be generated during the line-out period and can used to establish a basis upon which optimization calculations can be performed. Thus, even after the offset period, conventional optimization process require another period (typically about one hour) of waiting before the optimization can begin to generate the necessary historical data.

With reference again to FIG. 1, optimization targets can be generated for the first mode of operation at 108 when the cycle is determined to be steady. As shown for example in FIG. 4, conventional data optimization methods can be used for generating the optimization targets. Any data optimization method can be used as known in the art for its intended purpose. For example, one or more processors can be programmed to combine simulated behavior with cost information to generate optimization targets using algorithms known in the art.

However, and in contrast to conventional processes that use a pre-defined time period, as embodied herein, data for the entire cycle (except for the offset) can be used for optimization. A pre-defined time period of one hour is generally used in conventional processes. However, such a limited time period can be unsuitable to optimize values over the entire cycle for batch processes due to lingering effects from transient behavior. In addition, and as previously noted, an additional pre-determined line-out time is needed in conventional processes, which can result in fewer optimization solutions. Thus, and as embodied herein, the average of each output over the time period after the offset and before the beginning of the next cycle can be used as an input variable for generating optimization targets.

For example and without limitation, and with further reference to FIG. 6, a cycle can last six hours and the offset can be about ninety minutes. In this manner, data over a four and a half hour period can be used to determine the input variable for the optimization process. For batch processes, data over any particular one hour period can be unsuitable to accurately portray the cycle as a whole. For example, if the first hour after the beginning of the cycle at 602 was used, only the transient behavior can be considered in determining the optimization targets for the cycle as a whole. Similarly, for the example shown in FIG. 6, if the first hour after the offset 604 is used, the values can tend to be lower than the overall average due to the lingering effects of the transient period. In contrast, if the final hour before the beginning of the next cycle 606 is used, the data in the process shown in FIG. 6 can tend to be higher than the overall average. Although the data at the end of the cycle may be least affected by the transient behavior during the transient period, it will not necessarily be representative of the behavior of the cycle as a whole.

A wide variety of optimization targets can be generated in accordance with the disclosed subject matter. The optimization targets can vary based at least in part on the batch process being utilized. For purposes of explanation and not limitation, when the batch process is a coking process, the optimization targets can include reflux rate, pumparound flow rate, overhead temperature, overhead product specification, and bottom product specification of the distillation columns, and steam flows for stripping operations.

Figure 7:
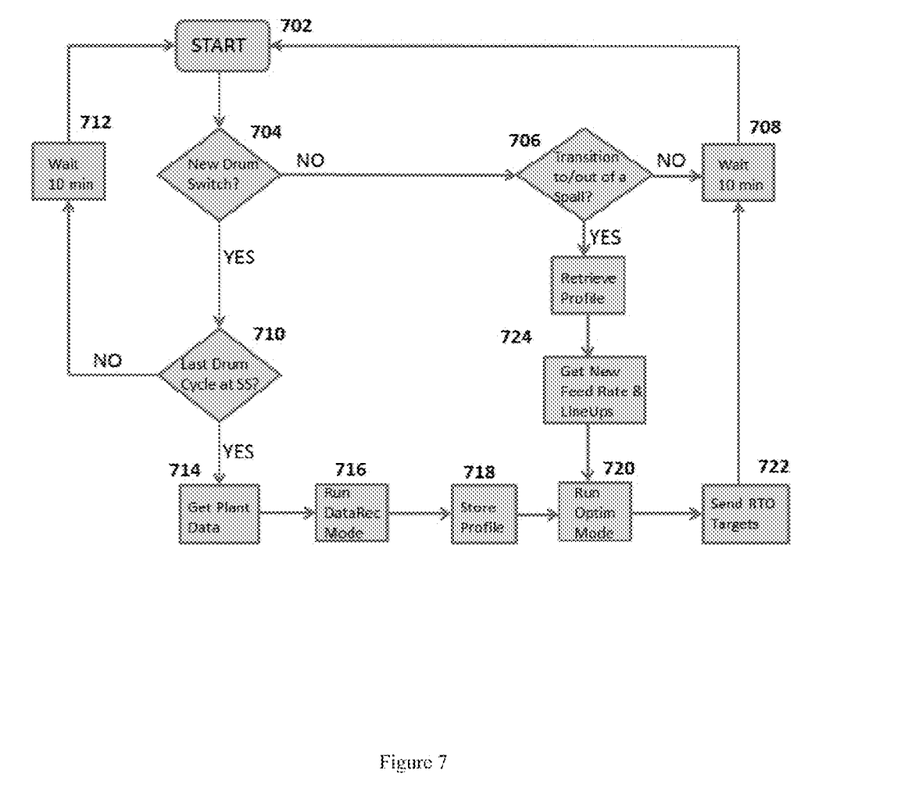
FIG. 7 is a logical diagram illustrating an exemplary embodiment of a process for optimizing a batch system including drum switch events and online spalling transition events in accordance with the disclosed subject matter.

Processes in accordance with the disclosed subject matter can include multiple modes of operation and multiple events. A logic diagram for a delayed coker optimization process involving drum switch events and online spalling transition events in accordance with the disclosed subject matter is shown in FIG. 7. The process starts at 702. The system can determine whether a new drum switch event has occurred at 704. If no drum switch event has occurred, the system can determine whether a new online spalling transition event has occurred at 706. If no online spalling transition event has occurred, the system can continue to check for additional events. However, as shown in the exemplary process in FIG. 7, no further events are included. Therefore, and as embodied herein, the system can wait for a period of time (e.g., ten minutes) at 708 and can return to the start of the process at 702 to check again for new events.

If a drum switch event is detected at 704, the system can proceed to determine whether the last drum cycle satisfied the steady state criteria. For example, the determination can be based on the process described in FIG. 5. As embodied herein, if the cycle exhibited unsteady behavior, the process can continue with no optimization updates being made. In this manner, the process can wait for a period of time (e.g., ten minutes) and then can return to the start 702. However, if the cycle exhibited steady behavior, the process can obtain plant data, i.e., process outputs such as temperature, pressure, flow rate, and product concentration rates at locations throughout the process, at 714. The process can enter data reconciliation mode at 716. In data reconciliation mode, the model associated with a particular mode of operation can be tuned to current feed properties and operating conditions based at least in part on current plant measurements. The reconciled data mode, including values for one or more variables, can be stored in a profile at 718. The reconciled data model can be used for optimization. For example, the profile can include calculated reconciled values for one or more variables. After the profile is generated, the profile can be retrieved when the system enters the mode of operation and the reconciled values can be used to generate an optimized solution based on, for example, certain operating variables such as furnace flow rates or steam flow rates.

The process can proceed to enter optimization mode at 720. In data optimization mode, certain variables of the model can be allowed to change from current values. The variables that are allowed to change can include control signals such as column reflux rate, pumparound flow rates, column overhead temperature, separation drum pressure, and the like. The optimization system can make adjustments to the variables within allowable ranges in order to optimize performance of the batch process. The optimization process can also take into account data from outside the process, e.g., cost data. The process can then compute the optimized values for the remaining control signals (e.g., temperatures, pressures, product specifications, and the like). A subset of the control signals can be deemed to be optimization targets that can implemented by the controller. Optimization targets can be sent at 722. The optimization targets can be used as long as the current cycle operates in the same mode as the previous cycle that was used as a basis for the optimization process, e.g., if both the current cycle and the previous cycle are delayed coker cycles. However, if a change in the mode of operation is detected by the system, the optimization cycle is restarted based on control signals based on the new mode of operation, as previously described herein.

If an online spalling transition event is detected at 706, the process can proceed to determine the configuration at 724. As noted above, online spalling can include the discontinuation of one or more of the furnace flow passes and the introduction of water flows through the furnace flow passes. The optimized values for control variables can vary based on these parameters. Therefore, the feed rate and furnace flow pass line up can be determined and a profile associated with that configuration can be retrieved. The process proceeds to enter optimization mode at 720. Optimization targets can then be sent at 722.

Figure 8:
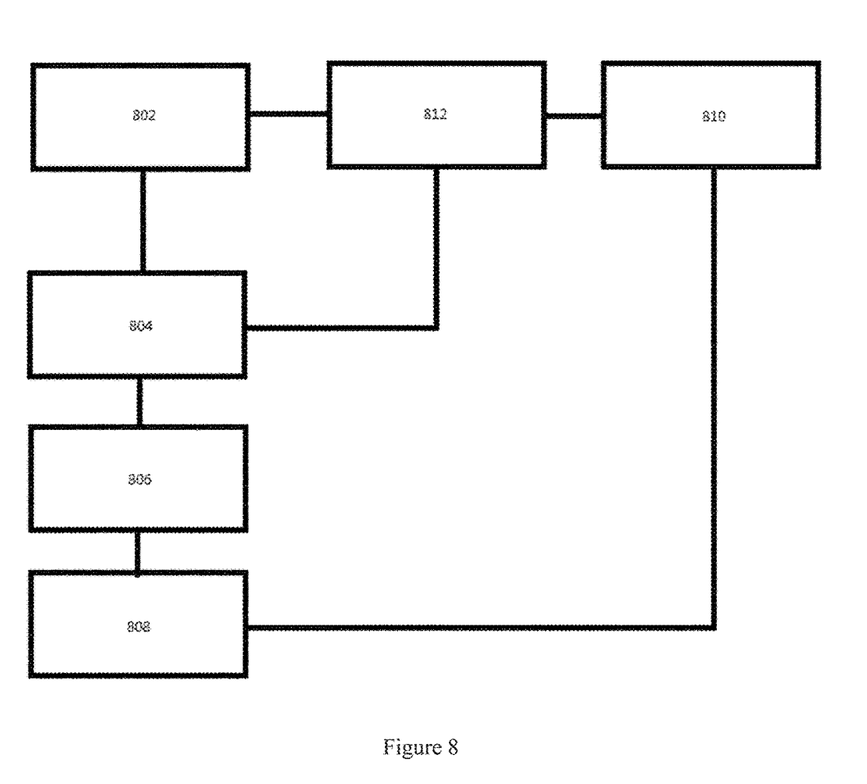
FIG. 8 is a schematic diagram illustrating an exemplary embodiment of a system for optimizing a batch system operating in a first mode of operation in accordance with the disclosed subject matter.

In accordance with another aspect of the disclosed subject matter, an apparatus for optimizing a system operating in a first mode of operation is provided. An exemplary embodiment of a system in accordance with the disclosed subject matter is shown in FIG. 8. The system includes a batch system 802 operating in a first mode of operation. The batch system 802 can be, for example, a delayed coker unit as illustrated and described with reference to FIG. 2.

The system can further include one or more sensors 804 for detecting parameters of the batch system 802. The one or more sensors 804 can be used to monitor the system to detect an event associated with a cycle in a first mode of operation. For example, sensors can detect a drum switch event based on the sudden decrease in temperature in one drum and a sudden increase of temperature in another drum. In another example, an online spalling transition event can be detected based on the sudden decrease of the flow rate in one furnace pass coupled with the sudden increase of the flow rate of spall water.

The one or more sensors 804 can also be used to determine the configuration of batch system 802. For example, if the one or more sensors 804 detect an online spalling transition event, the one or more sensors 804 can be used to determine the configuration of the furnace flow passes and the feed rate.

In addition, the one or more sensors 804 can be used to measure output values. The sensors 804 can include, for example, a temperature sensor for measuring the temperature of a drum or the main fractionator. The sensors 804 can also include sensors for measuring flow rates, e.g., in a furnace pass.

With further reference to FIG. 8, a steady state determination component 806 can be coupled to the one or more sensors 804. The term "coupled," as used herein, means operatively in communication with each other, either directly or indirectly, using any suitable techniques, including hard wire connectors or remote communication.

The steady state determination component 806 can be configured to determine whether data associated with the cycle satisfies steady state criteria. Any method for determining whether the data satisfies steady state criteria in accordance with the disclosed subject matter can be used. For example, the method shown in FIG. 5 can be implemented by the steady state determination component.

An optimization target generator 808 can be coupled to the steady state determination component 806. The optimization target generator 808 can generate optimization targets based on the data measured by the one or more sensors 804, for example when the steady state determination component 806 determines that the data satisfies steady state criteria. Conventional data optimization methods can be used to generate the optimization targets.

A profile database 810 can be coupled to the optimization target generator 808. The optimization targets generated by the optimization target generator 808 can be stored in the profile associated with the first mode of operation, which can be stored in the profile database 810. The profile database 810 can be stored in any suitable non-transitory storage media as known in the art.

A controller 812 can be coupled to batch system 802 to apply control signals including the optimization targets to the next cycle in the first mode of operation. The controller 812 can be coupled to the one or more sensors 804. When the one or more sensors 804 detect a change in mode of operation, the controller 812 can retrieve a profile associated with the new mode of operation from the profile database 810 and can apply the control signals to the batch system 802.

The steady state determination component 806, the optimization target generator 808, the controller 812, and other functional components of the optimization system 800 can be implemented in a variety of ways as known in the art. For example, each of the functional components can be implemented using an integrated single processor. Alternatively, each functional component can be implemented on a separate processor. Therefore, the optimization system 800 can be implemented using at least one processor and/or one or more processors.

The at least one processor comprises one or more circuits. The one or more circuits can be designed so as to implement the disclosed subject matter using hardware logic. Additionally or alternatively, the processor can be designed to carry out the instructions specified by computer code stored in a hard drive, a removable storage medium, or any other storage media. Such non-transitory computer readable media can store instructions that, upon execution, cause the at least one processor to perform the methods as disclosed herein. While the functional components can be implemented as hardware, software, or a combination thereof, those of skill in that art will recognize that a processor will be required to implement any instructions contained in storage media.

Additional Embodiments

Additionally or alternatively, the invention can include one or more of the following embodiments:

Embodiment 1. A method for optimizing a system operating in a first mode of operation, the method comprising detecting an event associated with a cycle operating in a first mode of operation, determining whether the cycle satisfies steady state criteria, generating optimization targets for the first mode of operation based on the data, and applying control signals comprising optimization targets, using one or more processors, for a next cycle operating in the first mode of operation.

Embodiment 2. The method of Embodiment 1, wherein the event comprises a drum change event.

Embodiment 3. The method of Embodiment 1, wherein the event comprises an online spalling transition event.

Embodiment 4. The method of any of the preceding Embodiments, wherein determining whether data associated with the cycle satisfies steady state criteria comprises selecting an offset, and determining whether data following the offset from the event satisfies the steady state criteria.

Embodiment 5. The method of Embodiment 4, wherein the offset is selected based on a time period of transient behavior in previous cycles operating in the first mode of operation.

Embodiment 6. The method of Embodiments 4 or 5, wherein the offset is about 90 minutes.

Embodiment 7. The method of any of the preceding Embodiments, wherein determining whether data associated with the cycle satisfies steady state criteria comprises separating the cycle into a first cycle portion and a second cycle portion, averaging a first set of data associated with the first cycle portion, averaging a second set of data associated with the second cycle portion, and determining whether an average of the first set of data and the average of the second set of data are within a predetermined tolerance of an overall average.

Embodiment 8. The method of any of the preceding Embodiments, wherein determining whether data associated with the cycle satisfies steady state criteria further comprises comparing a maximum value and a minimum value to an overall average.

Embodiment 9. The method of any of the preceding Embodiments, wherein the control signals further comprise optimized values for control variables.

Embodiment 10. The method of any of the preceding Embodiments, wherein the optimization targets comprises at least one of a reflux flow rate, a pumparound flow rate, an overhead temperature, an overhead product specification, and a bottom product specification.

Embodiment 11. The method of any of the preceding Embodiments, further comprising detecting a second event associated with a second cycle operating in the first mode of operation, determining that data associated with the second cycle satisfies the steady state criteria, adjusting the optimization targets for the first mode of operation based on data associated with the second cycle, and applying control signals comprising the adjusted optimization targets for a subsequent cycle in the first mode of operation.

Embodiment 12. The method of any of the preceding Embodiments, further comprising detecting a second event associated with a second cycle operating in the first mode of operation, determining that data associated with the second cycle does not satisfy the steady state criteria, and applying the control signals comprising the optimization targets without adjusting the optimization targets based on the data associated with the second cycle for a subsequent cycle in the first mode of operation.

Embodiment 13. A system for optimizing a system operating in a first mode of operation, comprising a monitoring component configured to monitor the system to detect an event associated with a cycle operating in a first mode of operation, a steady state determination component configured to determine whether data associated with the cycle satisfies steady state criteria, an optimization target generator configured to generate optimization targets for the first mode of operation based on the data, and a controller configured to apply control signals comprising the optimization targets for a next cycle operating in the first mode of operation.

Embodiment 14. The system of Embodiment 13, further comprising one or more sensors configured to measure one or more output values during the cycle.

Embodiment 15. The system of Embodiment 13 or 14, further comprising a database configured to store a profile associated with the mode of operation.

Embodiment 16. The system of any of Embodiments 13 through 15, configured for use in accordance with any of the methods described in Embodiments 1 through 12.

While the present application is described herein in terms of certain preferred embodiments, those skilled in the art will recognize that various modifications and improvements can be made to the application without departing from the scope thereof. Thus, it is intended that the present application include modifications and variations that are within the scope of the appended claims and their equivalents. Moreover, although individual features of one embodiment of the application can be discussed herein or shown in the drawings of one embodiment and not in other embodiments, it should be apparent that individual features of one embodiment can be combined with one or more features of another embodiment or features from a plurality of embodiments.

In addition to the specific embodiments claimed below, the application is also directed to other embodiments having any other possible combination of the dependent features claims below and those disclosed above. As such, the particular features presented in the dependent claims and disclosed above can be combined with each other in other manners within the scope of the application such that the application should be recognized as also specifically directed to other embodiments having any other possible combinations. Thus, the foregoing description of specific embodiments of the application has been presented for purposes of illustration and description. It is not intended to be exhaustive or to limit the application to those embodiments disclosed.

What is claimed is:

1. A method for optimizing a batch process system operating in at least one mode of operation, wherein the batch process system having successive cycles of operation in the at least one mode of operation, the method comprising:
   detecting an event associated with a cycle of operation of the batch process system operating in a first mode of operation by obtaining data associated with current operation of the batch process system;
   determining, using one or more processors, whether the obtained data associated with the cycle of operation satisfies steady state criteria,
   wherein determining whether the data associated with the cycle satisfies the steady state criteria comprises: selecting an offset, the offset is a transient period in which no data is recorded, obtaining data following the offset, and determining whether the data following the offset from the event satisfies the steady state criteria,
   wherein determining whether the data following the offset from the event satisfies the steady state criteria comprises: separating the cycle into a first cycle portion and a second cycle portion, averaging a first set of data associated with the first cycle portion, averaging a second set of data associated with the second cycle portion, and determining whether the average of the first set of data and the average of the second set of data are within a predetermined tolerance of an overall average, wherein the overall average is the average of all data including the first set of data and the second set of data;
   generating, using one or more processors, optimization targets for the first mode of operation based on the obtained data; and
   applying control signals comprising the optimization targets, using one or more processors, for a subsequent cycle of operation of the batch process system, when the batch process system is operating in the first mode of operation during a subsequent cycle of operation.

2. The method of claim 1, wherein the event comprises a drum change event, wherein the drum change event includes switching operation from one drum to another drum.

3. The method of claim 1, wherein the event comprises an online spalling transition event.

4. The method of claim 1, wherein the offset is selected based on a time period of transient behavior in previous cycles operating in the first mode of operation.

5. The method of claim 1, wherein the offset is about 90 minutes.

6. The method of claim 1, wherein determining whether the data following the offset associated with the cycle satisfies the steady state criteria further comprises comparing a maximum value and a minimum value to the overall average.

7. The method of claim 1, wherein the control signals further comprise optimized values for control variables.

8. The method of claim 1, wherein the optimization targets comprise at least one of a reflux flow rate, a pump-around flow rate, an overhead temperature, and overhead product specification, and a bottom product specification.

9. The method of claim 1, further comprising:
   detecting a second event associated with a second cycle operating in the first mode of operation;
   determining that data associated with the second cycle satisfies the steady state criteria;
   adjusting the optimization targets for the first mode of operation based on the data associated with the second cycle; and
   applying second control signals comprising the adjusted optimization targets for a subsequent cycle in the first mode of operation.

10. The method of claim 1, further comprising:
    detecting a second event associated with a second cycle operating in the first mode of operation;
    determining that data associated with the second cycle does not satisfy the steady state criteria; and
    applying the control signals comprising the optimization targets, without adjusting the optimization targets based on the data associated with the second cycle, for a subsequent cycle in the first mode of operation.

11. An apparatus for optimizing a batch process system having at least one operating mode, wherein the batch process system having successive cycles of operation in the at least one mode of operation, the apparatus comprising:
- at least one sensor configured to monitor the system to obtain data associated with the operation of the system during a cycle of operation and detect an event associated with a cycle operating in a first mode of operation; and
- at least one processor operatively connected to the at least one sensor,
- wherein the at least one processor determines whether or not the event associated with the cycle operating in the first mode of operation is operating in a steady state based upon a determination whether data associated with the cycle satisfies steady state criteria,
- wherein the determination whether the data associated with the cycle satisfies the steady state criteria comprises: selecting an offset, the offset is a transient period in which no data is recorded, obtaining data following the offset, and determining whether the data following the offset from the event satisfies the steady state criteria,
- wherein determining whether the data following the offset from the event satisfies the steady state criteria comprises: separating the cycle into a first cycle portion and a second cycle portion, averaging a first set of data associated with the first cycle portion, averaging a second set of data associated with the second cycle portion, and determining whether the average of the first set of data and the average of the second set of data are within a predetermined tolerance of an overall average, wherein the overall average is the average of all data including the first set of data and the second set of data, and
- wherein the at least one processor generates optimization targets for the first mode of operation based on the data;
- a database for storing the optimization targets generated by the at least one processor; and
- a controller configured to apply control signals comprising the optimization targets for a next cycle of operation of the batch process system operating in the first mode of operation.

* * * * *